(12) United States Patent
Gnech et al.

(10) Patent No.: US 9,811,509 B2
(45) Date of Patent: Nov. 7, 2017

(54) ENSURING INTEGRITY OF A DISPLAYED WEB PAGE

(71) Applicant: INTERNATIONAL BUSINESS MACHINES CORPORATION, Armonk, NY (US)

(72) Inventors: Thomas H. Gnech, Boeblingen (DE); Steffen Koenig, Boeblingen (DE); Oliver Petrik, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 489 days.

(21) Appl. No.: 14/060,756

(22) Filed: Oct. 23, 2013

(65) Prior Publication Data
US 2014/0129922 A1    May 8, 2014

(30) Foreign Application Priority Data
Nov. 7, 2012 (GB) .................................. 1220081.2

(51) Int. Cl.
*G06F 17/27* (2006.01)
*G06F 17/22* (2006.01)

(52) U.S. Cl.
CPC .................... *G06F 17/2247* (2013.01)

(58) Field of Classification Search
CPC ......... G06F 17/30905; G06F 17/30699; G06F 17/30887; G06F 21/10
See application file for complete search history.

(56) References Cited

U.S. PATENT DOCUMENTS

| 7,058,633 | B1 * | 6/2006 | Gnagy | ............. G06F 17/30887 |
| 7,152,090 | B2 | 12/2006 | Kuriyama | |
| 7,739,589 | B2 * | 6/2010 | Muschett | .......... G06F 17/30896 715/200 |

(Continued)

FOREIGN PATENT DOCUMENTS

| WO | WO2008157322 A1 | 12/2008 |
| WO | WO2009141201 A1 | 11/2009 |

(Continued)

OTHER PUBLICATIONS

Combined Search and Examination Report under Sections 17 and 18(3) for Application No. GB1318831.3, dated Feb. 25, 2014, pp. 1-7.

*Primary Examiner* — Wilson Tsui
(74) *Attorney, Agent, or Firm* — Steven Chiu, Esq.; Matthew M. Hulihan, Esq.; Heslin Rothenberg Farley & Mesiti PC

(57) ABSTRACT

Ensuring integrity of a displayed web page in a client-server infrastructure including defining an enhancement for a web page markup for an enhanced web page content including a provided web page content and at least one identified provider added content as prerequisite content for the provided content, implementing a secure web browser document object model (DOM) enhancement and an enhanced document object model (DOM) processing embedding a user-requested content and the at least one corresponding prerequisite content based on the web page markup enhancement so that the requested content and the at least one prerequisite content of the enhanced web page content of an enhanced web page are secured and displayed as entity.

20 Claims, 14 Drawing Sheets

(56) References Cited

U.S. PATENT DOCUMENTS

| | | | |
|---|---|---|---|
| 8,429,180 B1* | 4/2013 | Sobel | G06F 21/55 707/758 |
| 2005/0033700 A1 | 2/2005 | Vogler et al. | |
| 2005/0044185 A1* | 2/2005 | Hind | G06F 17/30699 709/219 |
| 2006/0235938 A1* | 10/2006 | Pennell | G06Q 30/02 709/217 |
| 2007/0294772 A1* | 12/2007 | Hydrie | G06F 21/10 726/27 |
| 2008/0139191 A1* | 6/2008 | Melnyk | G06F 17/30905 455/419 |
| 2009/0158140 A1 | 6/2009 | Bauchot et al. | |
| 2009/0287572 A1* | 11/2009 | Whelan | G06Q 30/02 705/14.55 |
| 2009/0292984 A1* | 11/2009 | Bauchot | G06F 17/30896 715/234 |
| 2011/0064383 A1 | 3/2011 | Bauchot et al. | |
| 2011/0119571 A1* | 5/2011 | Decker | G06F 17/30902 715/205 |
| 2011/0161145 A1* | 6/2011 | Mahajan | G06Q 30/02 705/14.4 |

FOREIGN PATENT DOCUMENTS

| | | |
|---|---|---|
| WO | WO2011046685 A1 | 4/2011 |
| WO | WO2012105995 A1 | 8/2012 |

* cited by examiner

ENSURING INTEGRITY OF A DISPLAYED WEB PAGE

PRIOR FOREIGN APPLICATION

This application claims priority from United Kingdom patent application number 1220081.2, filed Nov. 7, 2012, which is hereby incorporated herein by reference in its entirety.

BACKGROUND

One or more aspects of the present invention relate to web browser technology, and more specifically to a method for ensuring integrity of a displayed web page in a client-server infrastructure design and to a corresponding client-server infrastructure. Still more specifically, one or more aspects of the present invention relate to a data processing program and a computer program product for ensuring integrity of a displayed web page in a client-server infrastructure.

A field of an aspect of the present invention is web-based information, where web content is displayed together with additional content (e.g. advertisement) although not requested from the user (web content consumer). Therefore, to suppress not requested content, today's web browser technologies can be enabled for prior art content blocking However, the interest of the web content provider and especially their paying customers is to ensure that delivered content cannot be blocked from displaying.

A user requests a web page from a content provider (server side) using a web browser (client side). The web browser retrieves the requested page from the provider's web server. From the user's point of view, the delivered web page consists of user-requested content and not requested content (provider-added content), e.g. advertisement. In prior art web browser implementations, the user is able to apply content blockers and url filter lists which automatically avert loading and displaying the not requested content, or by removing the representation of the not requested content from the document object model (DOM) of the web page using browser-executed scripts (JavaScript, Flash) or plug-ins.

The content provider has no means to ensure that the document object model (DOM) remains unchanged such that the delivered web page is displayed as an entity. Especially, with simple means on the client side, the provider-added content can be blocked at the client side.

In the Patent Application Publication WO 2011/046685 A1, which is hereby incorporated herein by reference in its entirety, a method and a system for linking media components are disclosed. The disclosed system and method for linking media components include a processor that executes a handshake protocol according to which a video component is rendered conditional upon receipt of notification of rendering of an associated media component. The system and method additionally perform a keyword comparison algorithm to determine a relevancy between the video and other associated media component. For the linking of media components an external module is used, wherein content blocking is not prevented, thus, web page integrity is not ensured.

In the Patent Publication U.S. Pat. No. 7,152,091 B2, which is hereby incorporated herein by reference in its entirety, a contents distributing method and a contents distributing program are disclosed. The purpose of the disclosed method and program is to present advertisements properly to users. To realize this, a web server sends necessary related information, which includes links for download, to a client machine in accordance with a download request of the client machine. When the client machine requests start of download, by use of the link the web server, in response to the start of download request, distributes designated predetermined contents, and an advertisement supply server distributes predetermined advertisement contents. When an instruction from the client machine of forced termination of distribution of advertisement contents by the advertisement supply server occurs, the advertisement distributing server terminates distribution of advertisement contents and sends a forced termination flag, which shows forced termination of distribution, to the web server. The web server, in response to reception of the flag, ceases distribution of contents. The disclosed method and program are based on server-side components and the scope is the distribution, so that a web page as a whole is not covered but single links (URLs) within a web page. Further content blocking is not prevented. As a result, web page integrity is not ensured.

BRIEF SUMMARY

The technical problem underlying one or more aspects of the present invention is to provide a method and a client-server infrastructure for ensuring integrity of a displayed web page, which ensure that the web page will be displayed as a whole while avoiding the above mentioned shortcomings and pain points of prior art web page displaying.

According to one or more aspects of the present invention, a method for ensuring integrity of a displayed web page in a client-server infrastructure is provided, as well as a client-server infrastructure, a data processing program for ensuring integrity of a displayed web page in a client-server infrastructure, and a computer program product for ensuring integrity of a displayed web page in a client-server infrastructure.

In an embodiment of the present invention, a method for ensuring integrity of a displayed web page in a client-server infrastructure is provided. The method includes, for instance, defining an enhancement for a web page markup for an enhanced web page content including a provided web page content and at least one identified provider added content as prerequisite content for the provided web page content; and implementing a secure web browser document object model (DOM) enhancement and an enhanced document object model processing embedding a user-requested content and the at least one corresponding prerequisite content based on the web page markup enhancement, wherein the requested content and the at least one prerequisite content of the enhanced web page content of an enhanced web page are secured and displayed as an entity.

BRIEF DESCRIPTION OF THE SEVERAL VIEWS OF THE DRAWINGS

One or more embodiments of the present invention, as described in detail below, are shown in the drawings, in which.

DETAILED DESCRIPTION

Figure 1:
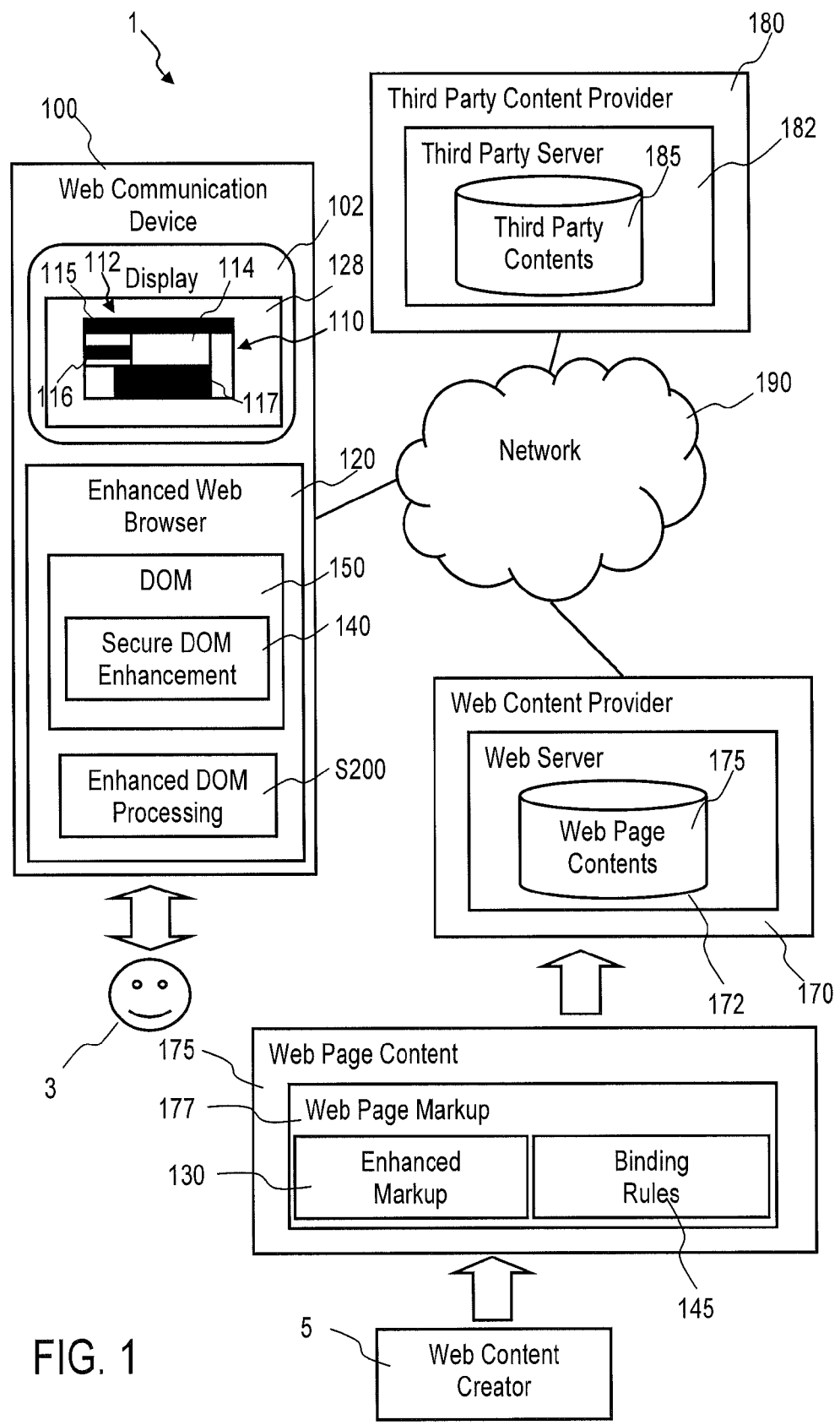
FIG. 1 is a schematic block diagram of a closed system client-server infrastructure, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1 to 9 are used to describe a secure document object model (DOM) in a closed (secure) system client-server infrastructure environment 1. Examples of closed systems are smart phone, tablet computer, TV set top box, gaming console etc.

FIGS. 10 to 15 are used to describe a secure document object model (DOM) in an open (unsecure) system client-server infrastructure environment 1'. Examples of such an open, thus un-secure, system can be any PC, Laptop etc. where the user can update, thus manipulate, operating system, web client and browser software easily.

Referring now to FIG. 1, showing a client-server infrastructure 1, in accordance with an embodiment of the present invention, comprising at least one web content provider 170, 180 with a corresponding web server 172, 182, and a client 100 with a corresponding enhanced web browser 120. The client 100 is developed as web communication device for a user 3, for example. A web content creator 5 creates an enhanced web page content 112 by applying a markup enhancement 130, 145 for the enhanced web page content 112, which comprises a provided web page content 117, 175 and at least one identified provider added content as prerequisite content 115, 116 for the at least one provided content 117, 175. The enhanced web browser 120 comprises a document object model (DOM) 150 with a secure document object model (DOM) enhancement 140 and runs an enhanced document object model (DOM) process S200 embedding a user-requested content 117 and the corresponding prerequisite content 115, 116 based on the markup enhancement 130, 145 so that the requested content 117 and the prerequisite content 115, 116 of the enhanced web page content 112 of an enhanced web page 110 are secured and displayed as entity on a display 102 of the client 100 with a web browser window 128.

So FIG. 1 depicts an enhanced document object model (DOM) system that is implemented as enhancement 140 to the enhanced web browser 120 and its document object model (DOM) 150, running on the web communication device 100, displaying the enhanced web page content 110. The web communication device 100 retrieves the web content 175, which includes enhanced markup 130 and binding rules 145 of a web page markup 177 from the web content provider 170 over a network 190. The web content 175 may include additional content 185 provided by a third-party content provider 180. The enhanced web browser 120 utilizing the enhanced document object model (DOM) process S200 extracts the binding rules 145 from the web page markup enhancement 130, 145 and stores them in the secure document object model (DOM) enhancement 140.

Figure 2:
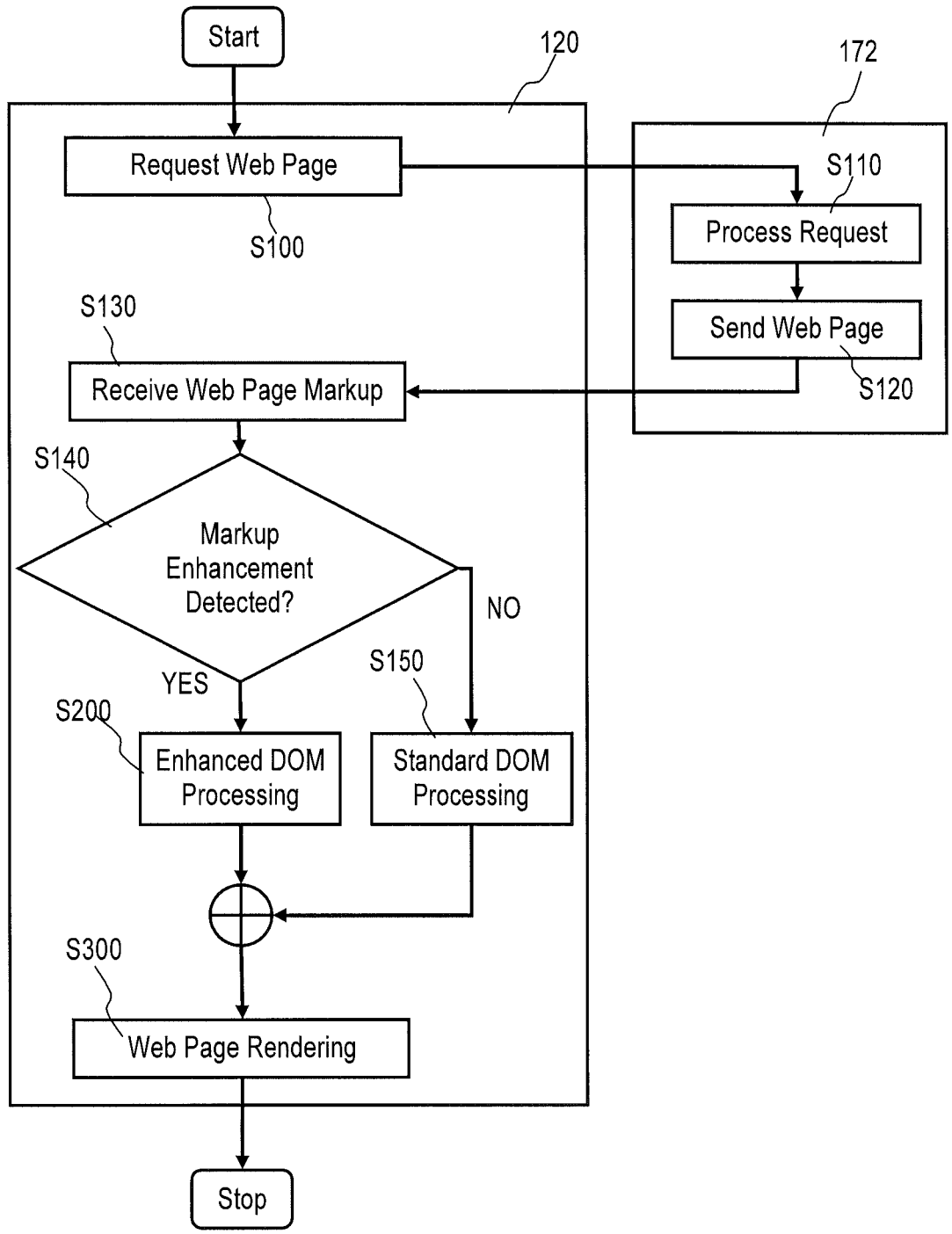
FIG. 2 is a schematic overall flow diagram of a method for ensuring integrity of a displayed web page in a client-server infrastructure, in accordance with an embodiment of the present invention.

Referring now to FIG. 2, showing a method for ensuring integrity of a displayed web page in a client-server infrastructure 1, in accordance with an embodiment of the present invention, the enhance web browser 120 sends a web page request in step S100 to the web server 172 of the web content provider 170. In step S110 the web server 172 processes the request and sends the requested web page in step S120 to the client 120. The client receives the web page markup 177 in step S130, and checks in step S140 if the received web page markup 177 comprises markup enhancements 130, 145. If markup enhancements 130, 145 are detected in step S140, the web browser runs the enhanced document object model (DOM) processing in step S200. If markup enhancements 130, 145 are not detected in step S140, the web browser runs a standard document object model (DOM) processing in step S150.

So FIG. 2 shows the processing of a document object model (DOM) in a standard processing in step S150 or in an enhanced processing in step S200 by the enhanced web browser 120 on the client side, which utilizes a secure (Secure Socket Layer) communication link with the web server 172 on the server side for requesting the web page and receiving the markup 177 of the web page. The markup 177 is checked for markup enhancements 130, 145 according to an aspect of the present invention. After document object model (DOM) processing in step S200 or S150 the web page is rendered in step S300. In step S300 the enhanced web browser 120 renders the web page content 112 according to a render action derived from an adherence to the binding rules 145.

Figure 3:
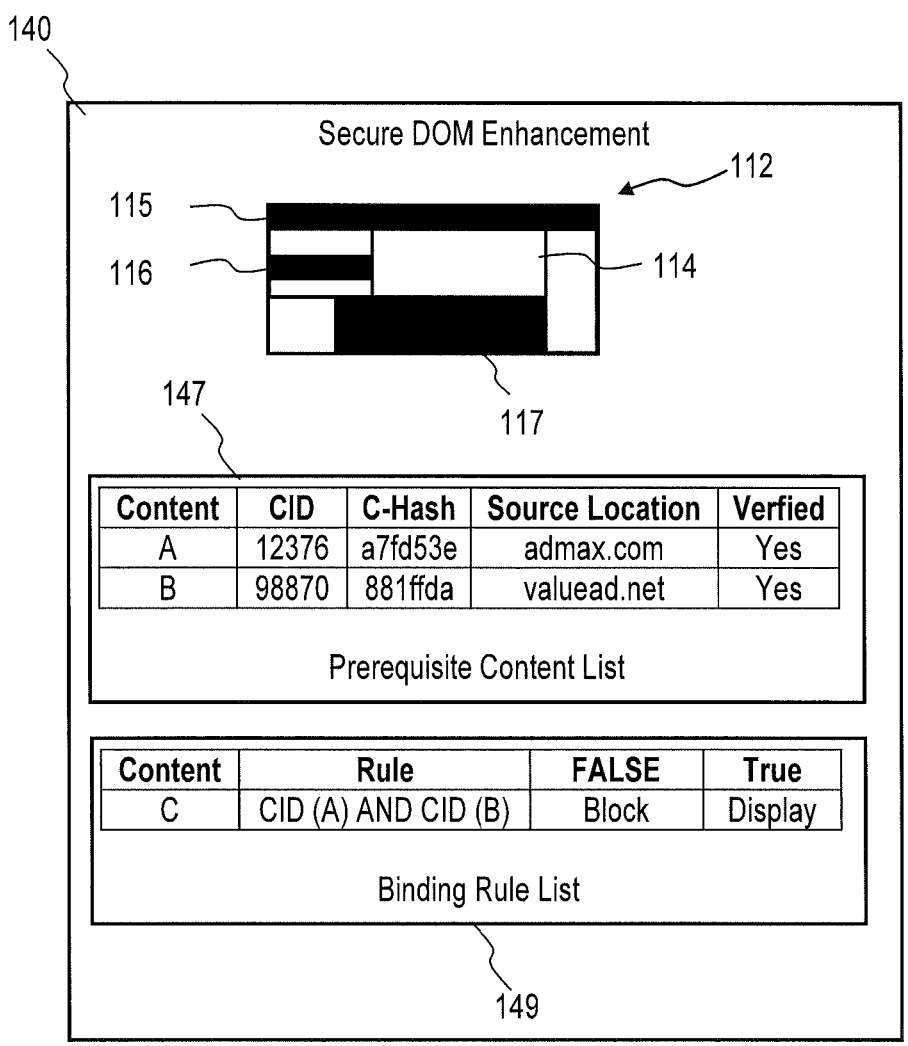
FIG. 3 is a schematic block diagram of a secure document object model (DOM) enhancement of the client-server infrastructure of FIG. 1, in accordance with an embodiment of the present invention.

FIG. 3 shows the secure document object model (DOM) enhancement 140, in accordance with an embodiment of the present invention. Referring to FIG. 3 the secure document object model (DOM) enhancement 140 includes the representation of the enhanced web page content 112 of prerequisite web content (A) 115, prerequisite web content (B) 116, requested web content (C) 117 and standard content 114, a prerequisite content list 147, and a binding rule list 149. In the shown embodiment following attributes are used as enhancement 130, 145 of the web page markup 177: A content identification (CID), a calculated hash (C-Hash), a source location of the content 175 and a set of binding rules 145 defining a prerequisite logic of web page content 115, 116, 117. In the shown embodiment the enhanced document object model (DOM) processing S200 produces an enhanced web page 110 comprising enhanced content 112 mixed with standard content 114. Alternatively, in an embodiment not shown the enhanced document object model (DOM) processing S200 can produce an enhanced web page 110 comprising enhanced content 112 only.

Figure 4:
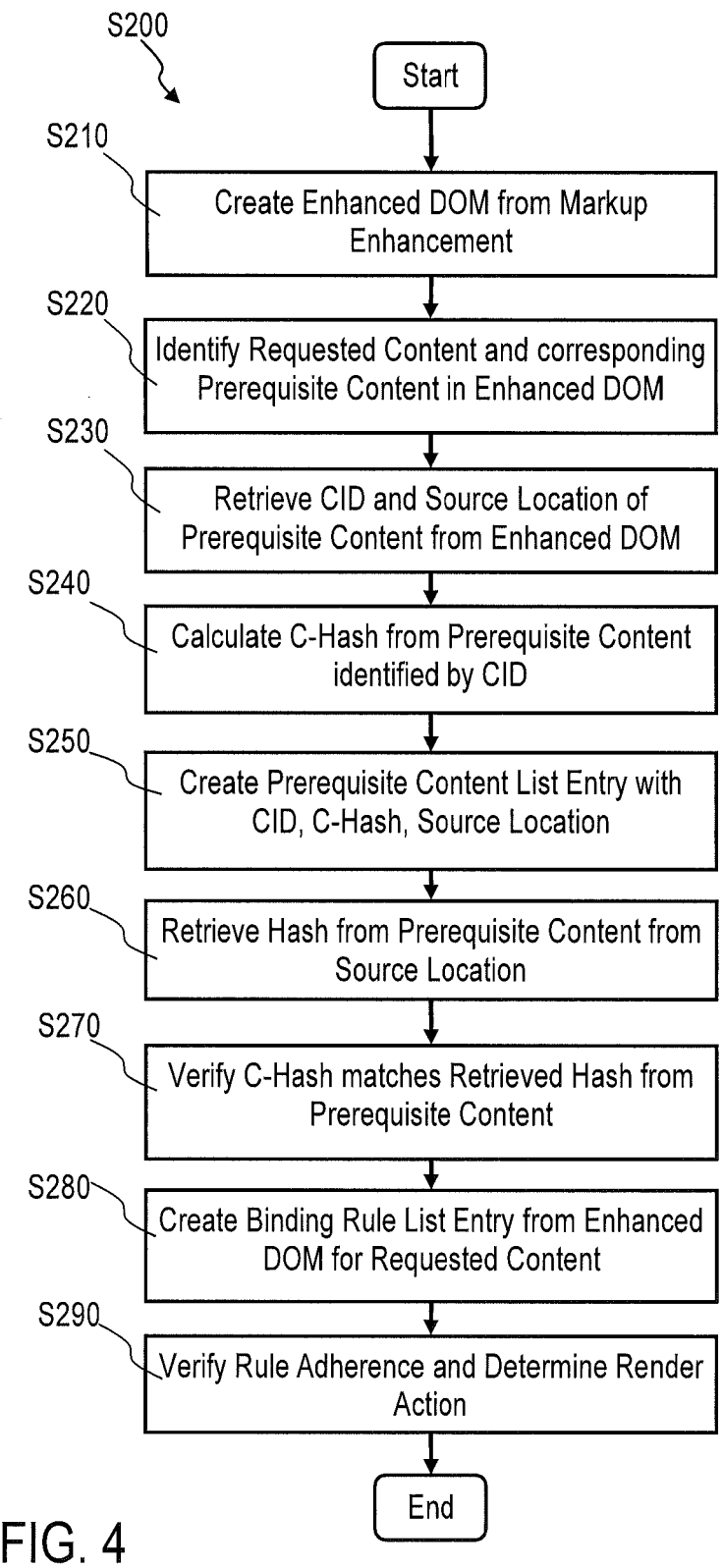
FIG. 4 is a schematic flow diagram of an enhanced document object model (DOM) processing used in the method for ensuring integrity of a displayed web page in a client-server infrastructure of FIG. 2, in accordance with an embodiment of the present invention.

FIG. 4 shows an enhanced document object model (DOM) processing S200 used in the method for ensuring integrity of a displayed Web page in a client-server infrastructure of FIG. 2, in accordance with an embodiment of the present invention.

Referring to FIG. 4, the steps S210 to S290 of the enhanced document object model (DOM) processing S200 are repeated for all contents 112, 114, 115, 116, 117 of the requested web page 110. In step S210, the secure document object model (DOM) enhancement 140 is created from the markup enhancements 130, 145. The secure document object model (DOM) enhancement 140 now includes all contents 115, 116, 117 for the requested web page, namely the content 117 requested by the user 3 plus the content which is prerequisite content 115, 116 to the content 117 requested by the user 3. In step S220, for the content 117 requested by the user 3, the prerequisite content 115, 116 is identified in the secure document object model (DOM) enhancement 140 and the attributes content identification (CID) and source location of the prerequisite content 115, 116 is retrieved from the secure document object model (DOM) enhancement 140 in step S230. Then in step S240, a hash value, called calculated hash (C-Hash), is calculated from the prerequisite content 115, 116 identified by its content identification (CID). In step S250, the entry for the prerequisite content list 147 is created including the content identification (CID), the calculated hash (C-Hash) and the source location. For verification of the prerequisite content 115, 116, a hash value of the prerequisite content 115, 116 is retrieved from the source location in step S260. The prerequisite content 115, 116 is verified in step S270 only if the calculated hash (C-Hash) matches the hash retrieved from the source location. In step S280, for the requested content 117 an entry for the binding rule list 149 is created from the secure document object model (DOM) enhancement 140. So, the prerequisite logic of the requested content 117 retrieved from the secure document object model (DOM) enhancement 140 is stored as entry in the binding rule list 149. The rule adherence with the prerequisite logic is verified and the resulting render action is assigned to the entry in the binding rule list in step S290.

Figure 5:
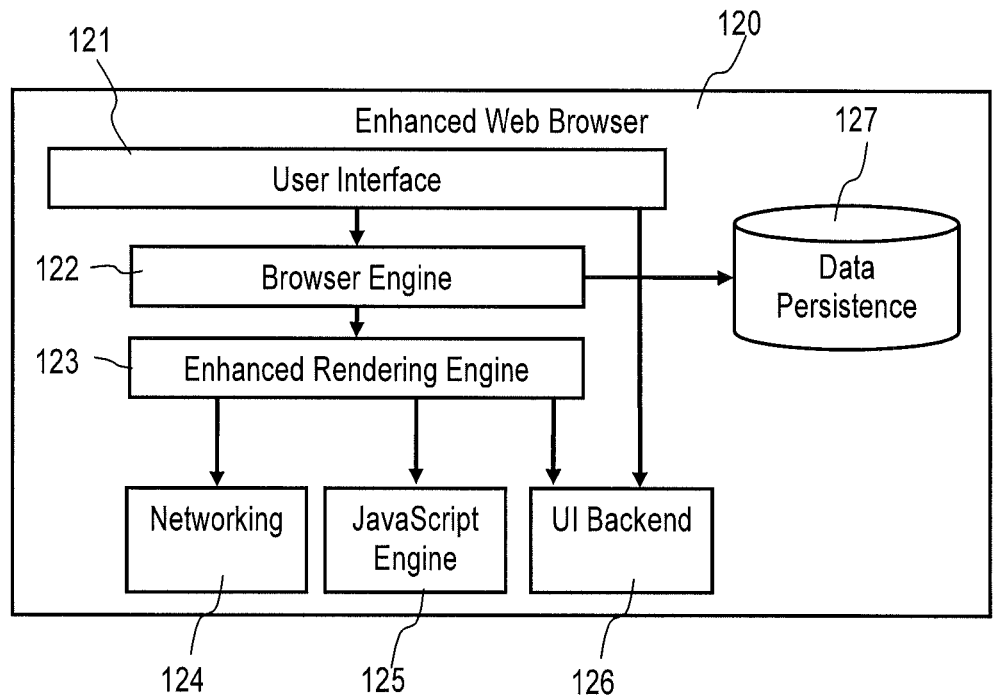
FIG. 5 is a schematic block diagram of an enhanced web browser structure for the client-server infrastructure of FIG. 1, in accordance with an embodiment of the present invention.

FIG. 5 shows an enhanced web browser structure 120 for the client-server infrastructure 1 of FIG. 1, in accordance with an embodiment of the present invention.

Referring to FIG. 5 the enhanced web browser 120 comprises a user interface 121, e.g. address bar, navigation buttons, menus, etc., a browser engine 122 with an interface to an enhanced rendering engine 123, the enhanced rendering engine 123 displaying the enhanced web page content 112 including the requested content 117 and the prerequisite content 115, 116, a network layer abstraction 124 for network input/output (I/O) operations, a JavaScript engine 125 for parsing and executing JavaScript code, a user interface backend 126 with a generic, platform independent drawing engine, and a data persistence 127 for storing files, cookies and web databases.

Figure 6:
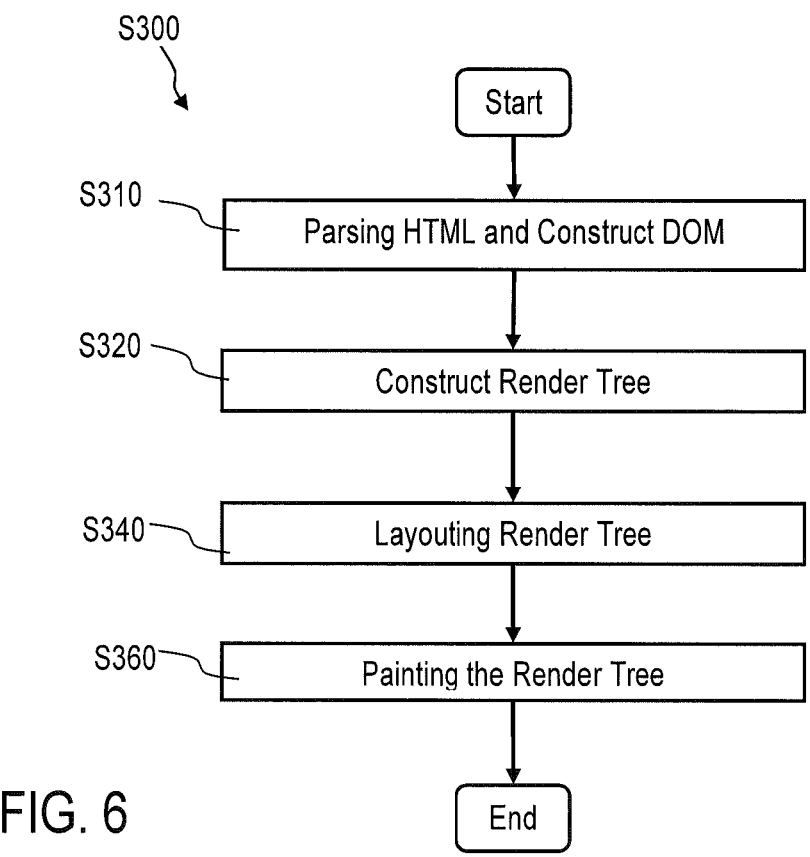
FIG. 6 is a schematic flow diagram of a web page rendering process used in the method for ensuring integrity of a displayed web page in a client-server infrastructure of FIG. 2, in accordance with an embodiment of the present invention.
Figure 7:
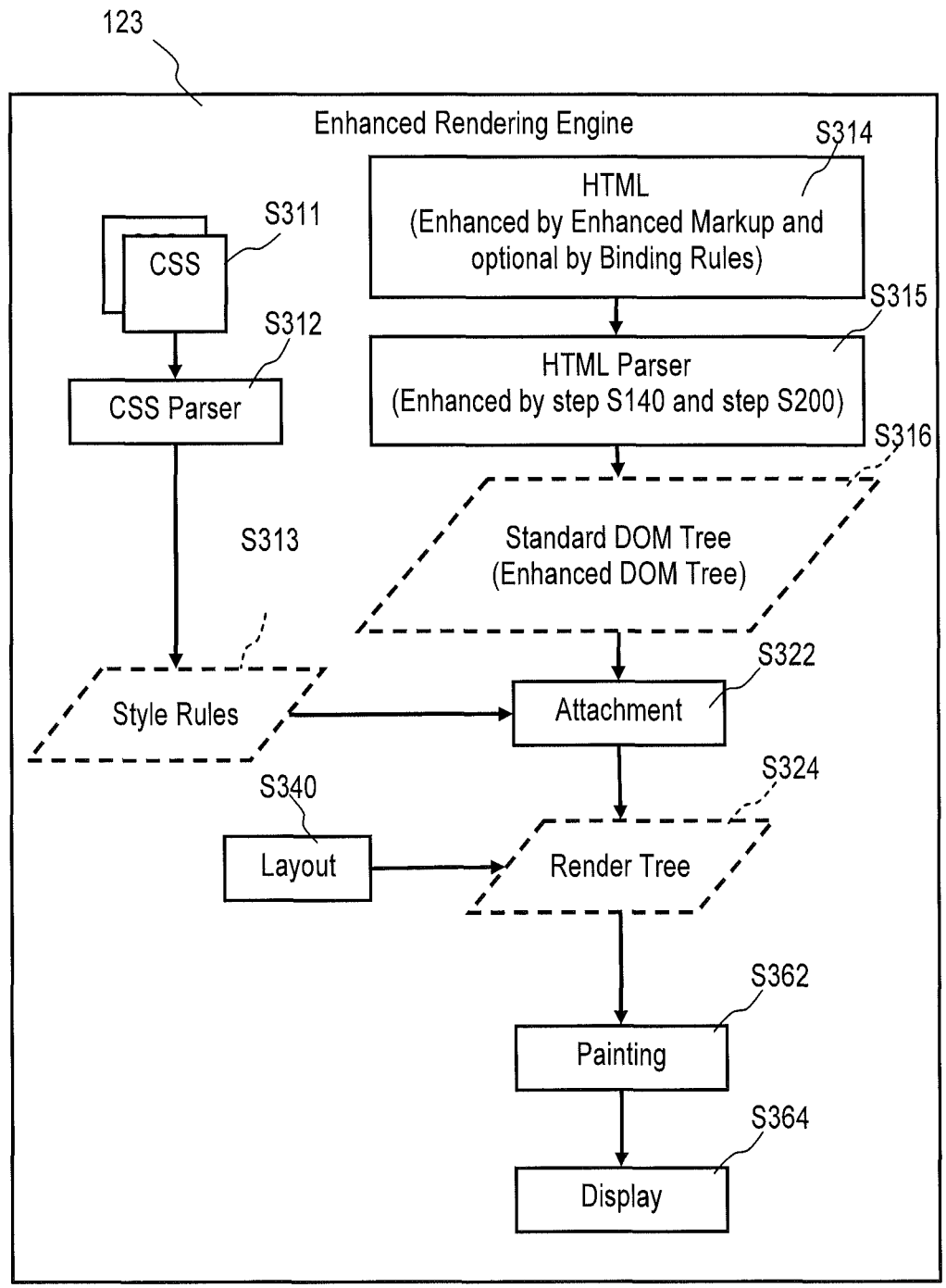
FIG. 7 is a more detailed schematic flow diagram of the web page rendering process of FIG. 6, in accordance with an embodiment of the present invention.

FIG. 6 shows a web page rendering process 5300 used in the method for ensuring integrity of a displayed web page in a client-server infrastructure of FIG. 2, in accordance with an embodiment of the present invention. FIG. 7 shows a more detailed schematic flow diagram of the web page rendering process of FIG. 6 performed by an enhanced rendering engine 123 shown in FIG. 5, in accordance with an embodiment of the present invention.

Referring to FIG. 6, in step S310 the enhanced rendering engine 123 parses the HTML (Hyper Text Mark-up Language) document including the requested content 117 and the prerequisite content 115, 116 turning the HTML (Hyper Text Mark-up Language) tags into document object model (DOM) nodes in a tree structure called content tree. In addition to the HTML (Hyper Text Mark-up Language), the enhanced rendering engine 123 parses style data from external CSS (Cascading Style Sheets) files and style elements in the HTML (Hyper Text Mark-up Language). In step S320 CSS (Cascading Style Sheets) styling information and visual instructions in the HTML (Hyper Text Mark-up Language) will be used to construct the render tree. The render tree contains rectangles with visual attributes like color and dimensions. After creation, the render tree is laid out in step S340, meaning each node of the tree is given its exact screen coordinates where it should be displayed on the screen. In the painting phase of step S360, the render tree is traversed and each node is painted on the display 102 using the user interface backend layer 126.

Referring to FIG. 7, the enhanced rendering engine 123 implements the step S310 as steps S311 to S316, wherein in step S311 external CSS (Cascading Style Sheets) files and style elements are loaded and a CSS (Cascading Style Sheets) parser is used in step S312 to parses the style data from the external CSS (Cascading Style Sheets) files and style elements in the HTML (Hyper Text Mark-up Language) to create style rules outputted in step S313. In step S314 the HTML (Hyper Text Mark-up Language) document including the requested content 117 and the prerequisite content 115, 116 is loaded, wherein the HTML (Hyper Text Mark-up Language) document is enhanced by the enhanced markup 130 and optional by the binding rules 145, shown in FIG. 1. In step S315, a HTML parser is used to parse the HTML (Hyper Text Mark-up Language) document including the requested content 117 and the prerequisite content 115, 116, turning the HTML (Hyper Text Mark-up Language) tags into document object model (DOM) nodes in a tree structure called content tree outputted in step S316. The parsing process of step S315 is enhanced by the step S140, shown in FIG. 2, to detect markup enhancements like the enhanced markup 130 and the binding rules 145. If no markup enhancements are detected in step S140, a standard DOM processing is performed in step S150 and the HTML parser outputs a standard DOM tree in step S316. If markup enhancements are detected in step S140 an enhanced DOM processing is performed in step S200 and the HTML parser outputs an enhanced DOM Tree in step S316. The enhanced rendering engine 123 implements the step S320 as steps S322 and S324, wherein in step S322 the style rules are attached to the content tree, wherein the CSS (Cascading Style Sheets) styling rules and visual instructions in the HTML (Hyper Text Mark-up Language) are used to construct the render tree in step S324, wherein the layout of the render tree is created in step S340. The enhanced rendering engine 123 implements the step S360 as steps S362 and S364, wherein in step S362 the render tree is traversed and in step S364 each node is painted and displayed on the display 102 using the user interface backend layer 126. Optional components of the present invention can be implemented in the CSS (Cascading Style Sheets) path as a supplement to the implementation shown in FIG. 7.

Figure 8:
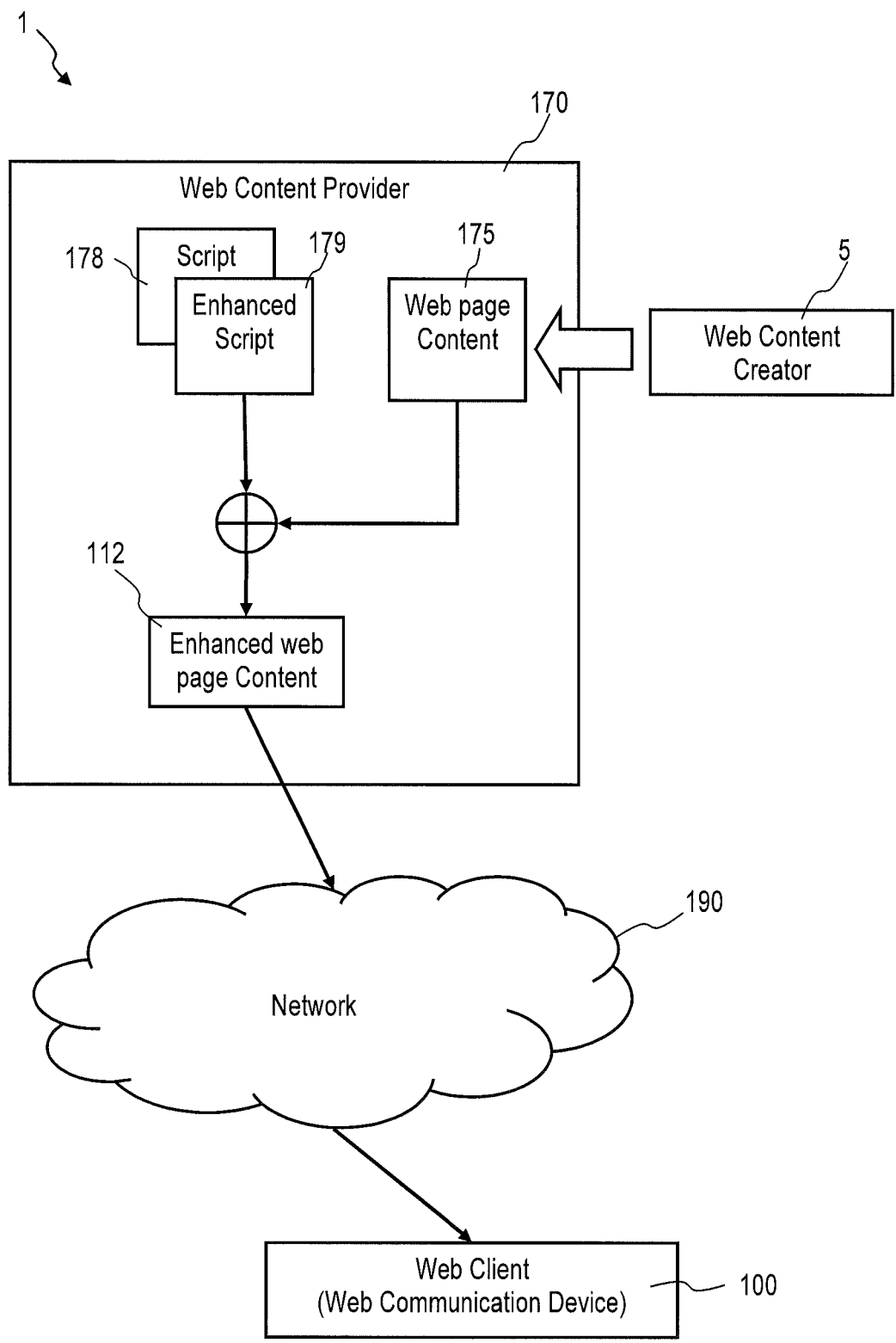
FIG. 8 is a schematic flow diagram of a web page content enhancement process for secure document object model (DOM) enhancement used in the client-server infrastructure of FIG. 1, in accordance with an embodiment of the present invention.

FIG. 8 shows a web page content enhancement process for the secure document object model (DOM) enhancement 140 used in the client-server infrastructure 1 of FIG. 1, in accordance with an embodiment of the present invention.

Referring to FIG. 8, the web content provider 170 receives the web page content 175 created and published by the web content creator 5. The web content provider 170 processes the web page content 175 by applying scripts 178, 179, comprising standard scripts 178 and enhanced scripts 179, which embed defined content areas, e.g. to contain advertisement or other third-party content. Embodiments of the present invention enhance the standard scripts 178 by the enhanced scripts 179 adding functionality to handle prerequisite content areas. The enhanced scripts 179 now also embed prerequisite content areas in the web page content 175, resulting in the enhanced web page content 112 according to one or more aspects of the present invention. The enhanced web page content 112 is delivered through the network 190 to the requesting web client 100.

Figure 9:
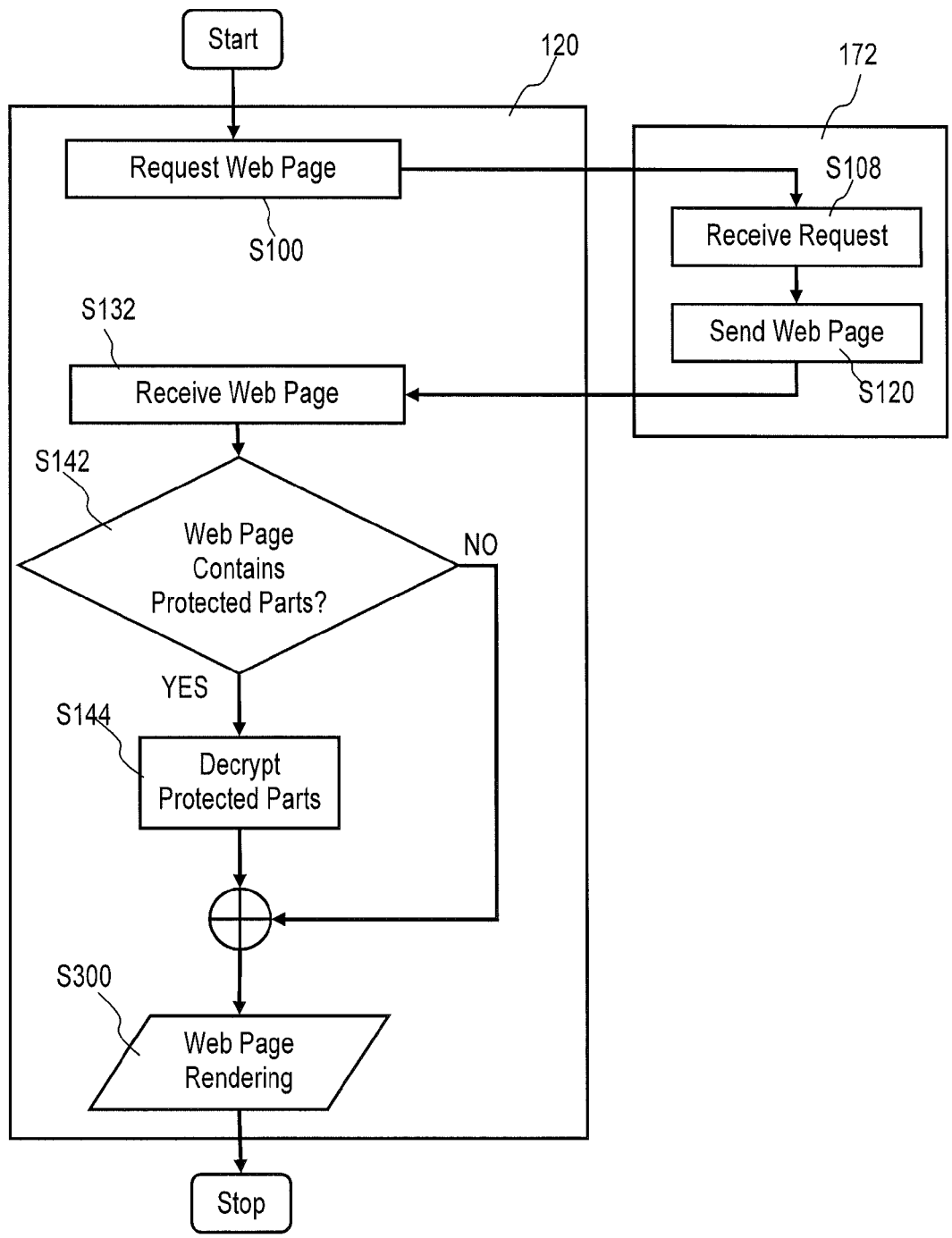
FIG. 9 is a schematic flow diagram for processing encrypted prerequisite and requested content used in the client-server infrastructure of FIG. 1, in accordance with an embodiment of the present invention.

FIG. 9 shows the processing of encrypted prerequisite and requested content used in the client-server infrastructure of FIG. 1, in accordance with an embodiment of the present invention.

Referring to FIG. 9, the enhanced web browser 120 requests a web page in step S100, and the web server 172 of the content provider 170 receives and processes the request in step S108. To avoid viewing the requested content 117 without loading and/or requesting the prerequisite content 115, 116 by utilizing a prior art web browser implementation, the requested content 117 and its prerequisite content 115, 116 is sent encrypted to the enhanced web browser 120 in step S120. The enhanced web browser 120 receives the web page in step S132 and checks in step S142, if the received web page contains protected parts. Decryption will only be performed by enhanced web browsers 120 in step S144 implementing the secure document object model (DOM) enhancement 140 according to one or more aspects of the present invention when a positive verification of a set of binding rules 145 has been performed. Rendering of the web page is performed in step S300, as described above.

Figure 10:
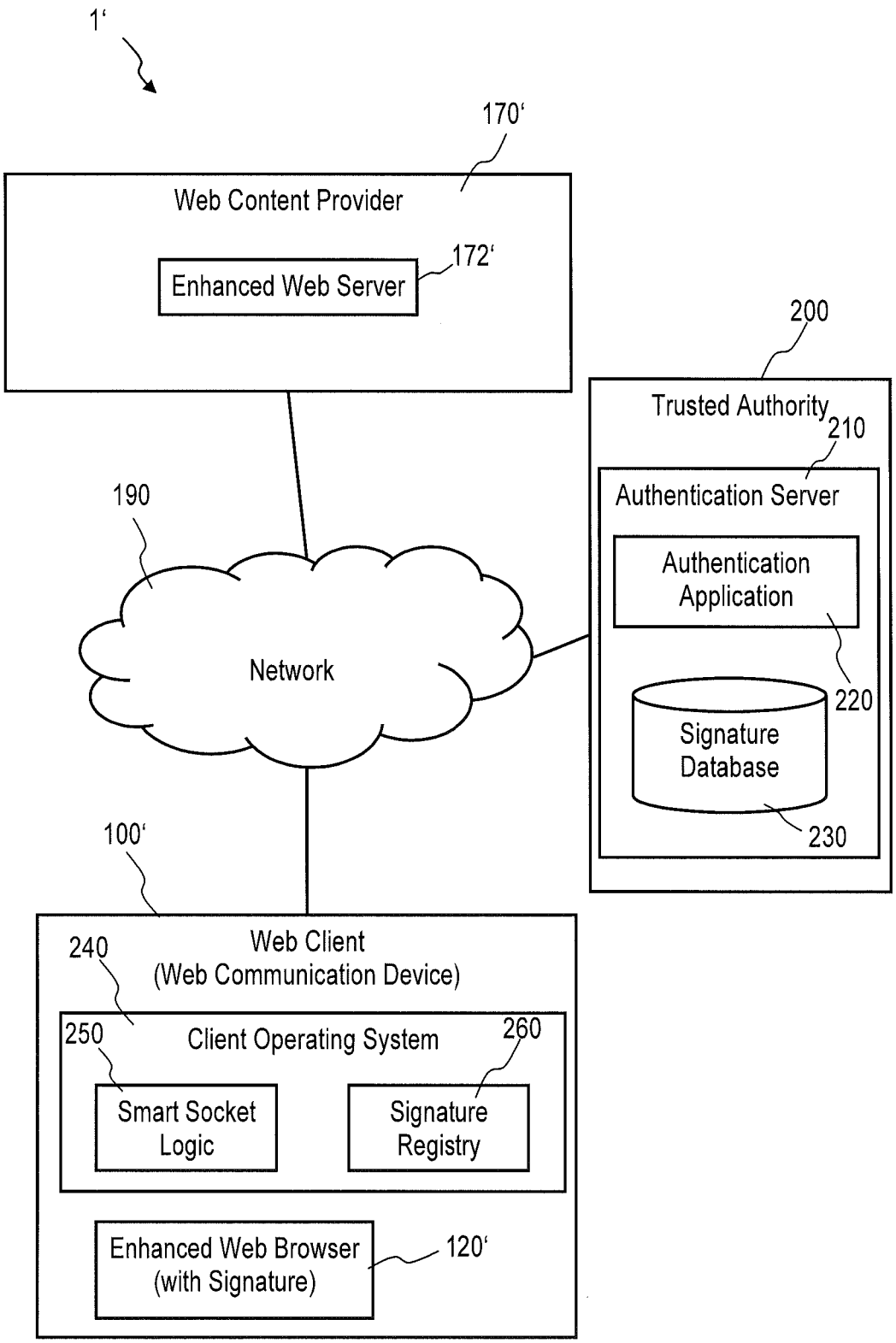
FIG. 10 is a schematic block diagram of an open system client-server infrastructure, in accordance with an embodiment of the present invention.
Figure 11:
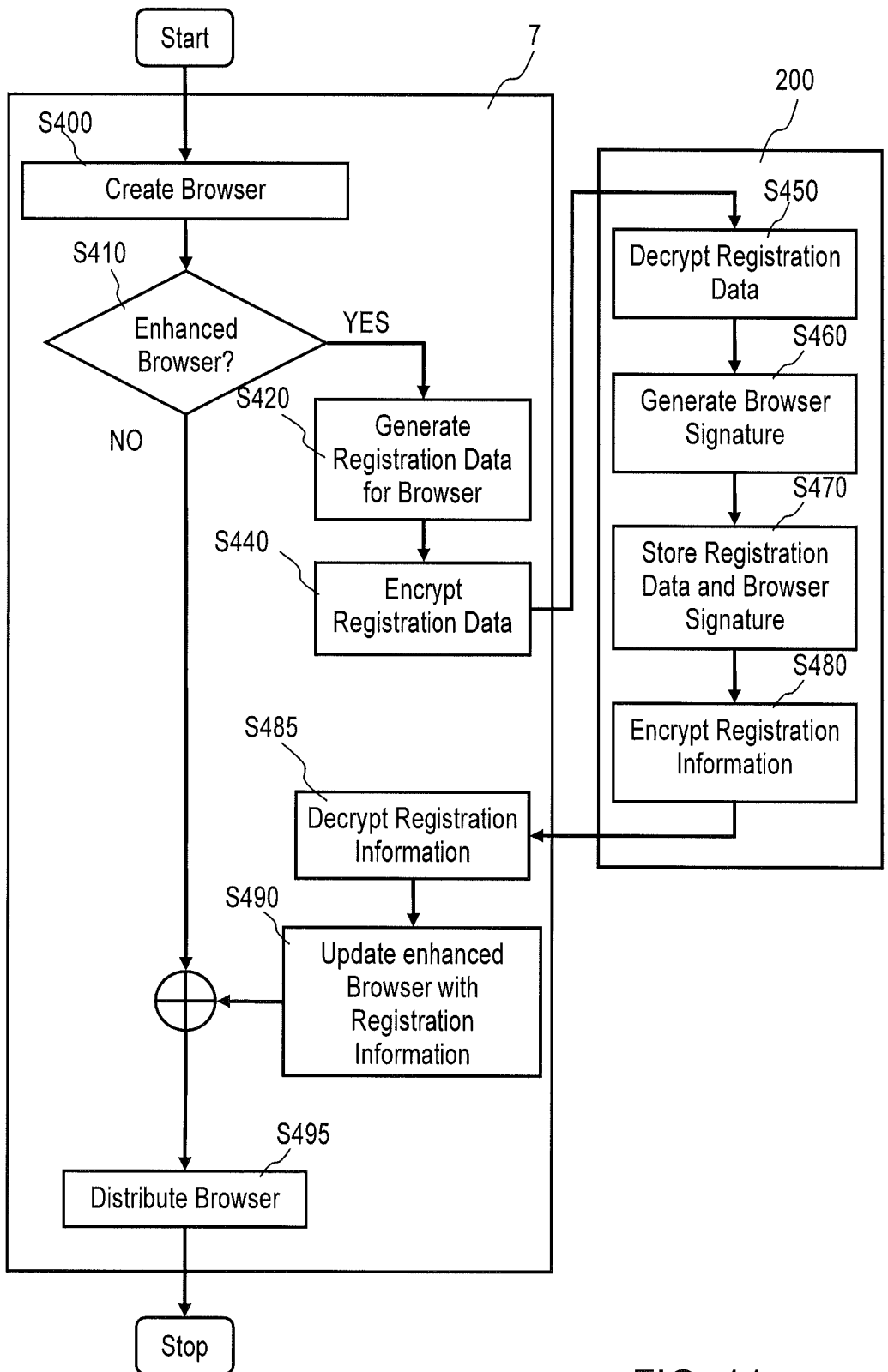
FIG. 11 is a schematic flow diagram of a browser registration process by provider for the client-server infrastructure of FIG. 10, in accordance with an embodiment of the present invention.
Figure 12:
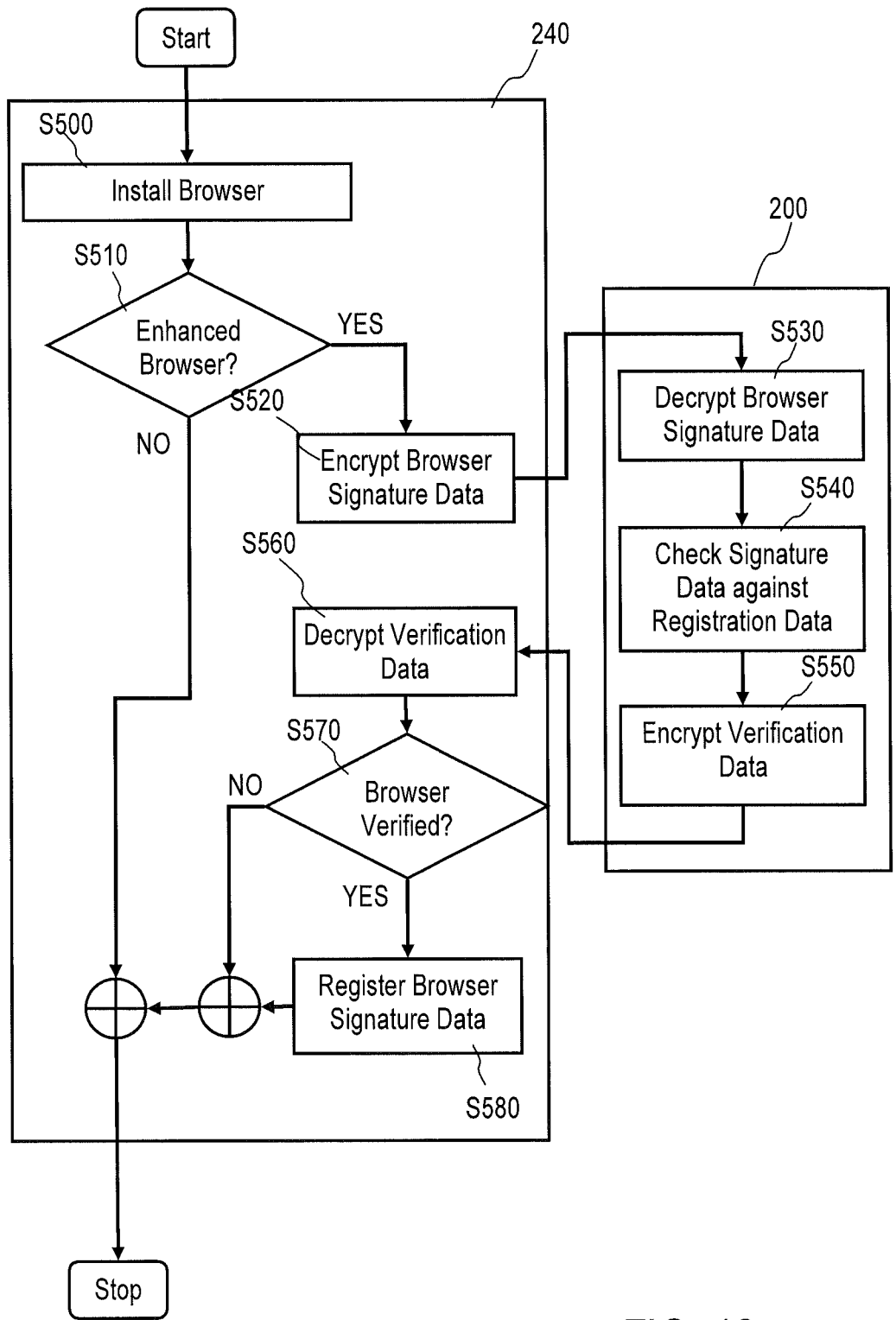
FIG. 12 is a schematic flow diagram of a browser installation process by user for the client-server infrastructure of FIG. 10, in accordance with an embodiment of the present invention.

FIG. 10 shows an open system client-server infrastructure 1', in accordance with an embodiment of the present invention. FIG. 11 shows a browser registration process by provider for the client-server infrastructure 1' of FIG. 10, in accordance with an embodiment of the present invention; and FIG. 12 shows a browser installation process by user for the client-server infrastructure 1' of FIG. 10, in accordance with an embodiment of the present invention.

Referring to FIG. 10, a web content provider 170' running an enhanced web server 172' according to an aspect of the present invention, is connected to the network 190. A web client 100', running an enhanced web browser 120' with signature according to an aspect of the present invention, is connected to the network 190 over smart socket logic 250 and maintains a signature registry 260, wherein the smart socket logic 250 and the signature registry 260 are enhancements of a client operating system 240.

A trusted authority 200 running an authentication server 210 is connected to the network 190, too. The authentication server 210 runs an authentication application 220, wherein the authentication application 220 uses a signature database 230 for storing and verifying signatures of the enhanced web browser 120'.

Referring to FIG. 11, the browser registration process is started by a browser provider 7 to first create a browser in step S400. If the check for an enhanced browser in step S410 yields "no", the browser—as a standard browser—is made available for download or other distribution channels in step S495. If the check in step S410 yields "yes", the registration process generates registration data for the enhanced browser 120' in step S420, encrypts registration data and sends registration data in step S440 to the trusted authority 200. The trusted authority 200 decrypts the registration data in step S450, generates a browser signature in step S460, stores the registration data together with the browser signature as registration information in the signature database 230 in step S470, and encrypts the registration information and sends the registration information to the browser provider 7 in step S480. The browser provider 7 decrypts the registration information in step S485 and adds the registration information to the enhanced browser code in step S490. The browser—as an enhanced browser 120' according to an aspect of the present invention—is made available for download or other distribution channels in step S495.

Referring to FIG. 12, the browser installation process is started on the client operating system 240 by the user in step S500. While executing install task a check for an enhanced browser 120' is performed in step S510. If the check in step S510 yields "no", a standard browser install task is completed. If the check in step S510 yields "yes", the client operating system 240 encrypts the signature data of the enhanced browser 120' using the signature registry 260 and sends the signature data to the trusted authority 200 in step S520. The trusted authority 200 decrypts the signature data in step S530 and checks the signature data against the registration data in step S540, and encrypts resulting verification data and sends the verification data to the signature registry 260 of the client operating system 240 in step S550.

The client operating system 240 decrypts the verification data using the signature registry 260 in step S560. If the browser is not identified as a registered and enhanced browser 120' according to an aspect of the present invention in step S570, the install task is completed. In this case the browser is treated as a standard browser. If the browser is identified as a registered and enhanced browser 120' according to an aspect of the present invention in step S570, the browser is registered as an enhanced browser 120' according to an aspect of the present invention by storing its signature data in the signature registry 260 in step S580, and the install task is completed.

Figure 13:
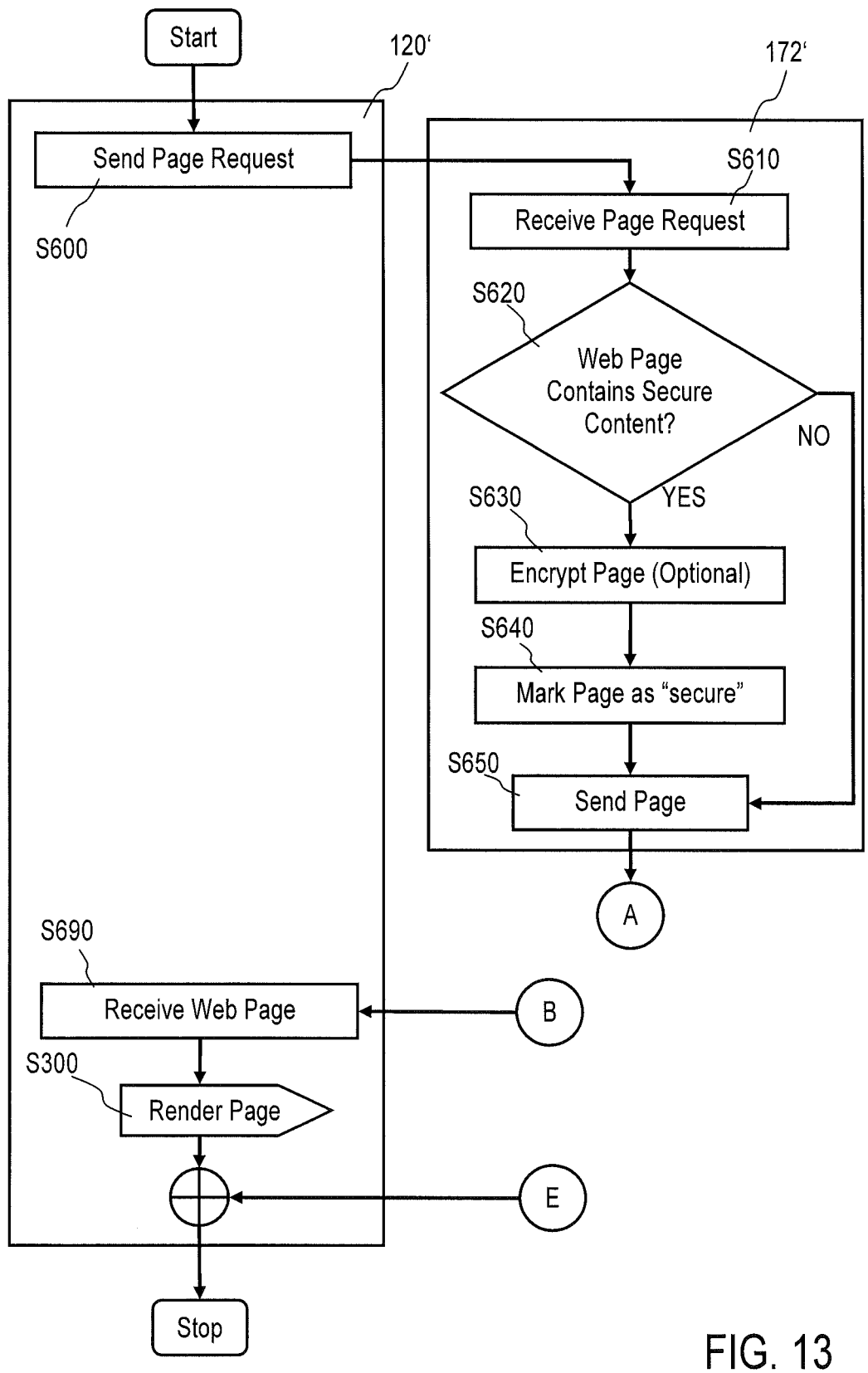
FIGS. 13 to 15 are a schematic flow diagram of an enhanced browser operation for a page request in the client-server infrastructure of FIG. 10, in accordance with an embodiment of the present invention.
Figure 14:
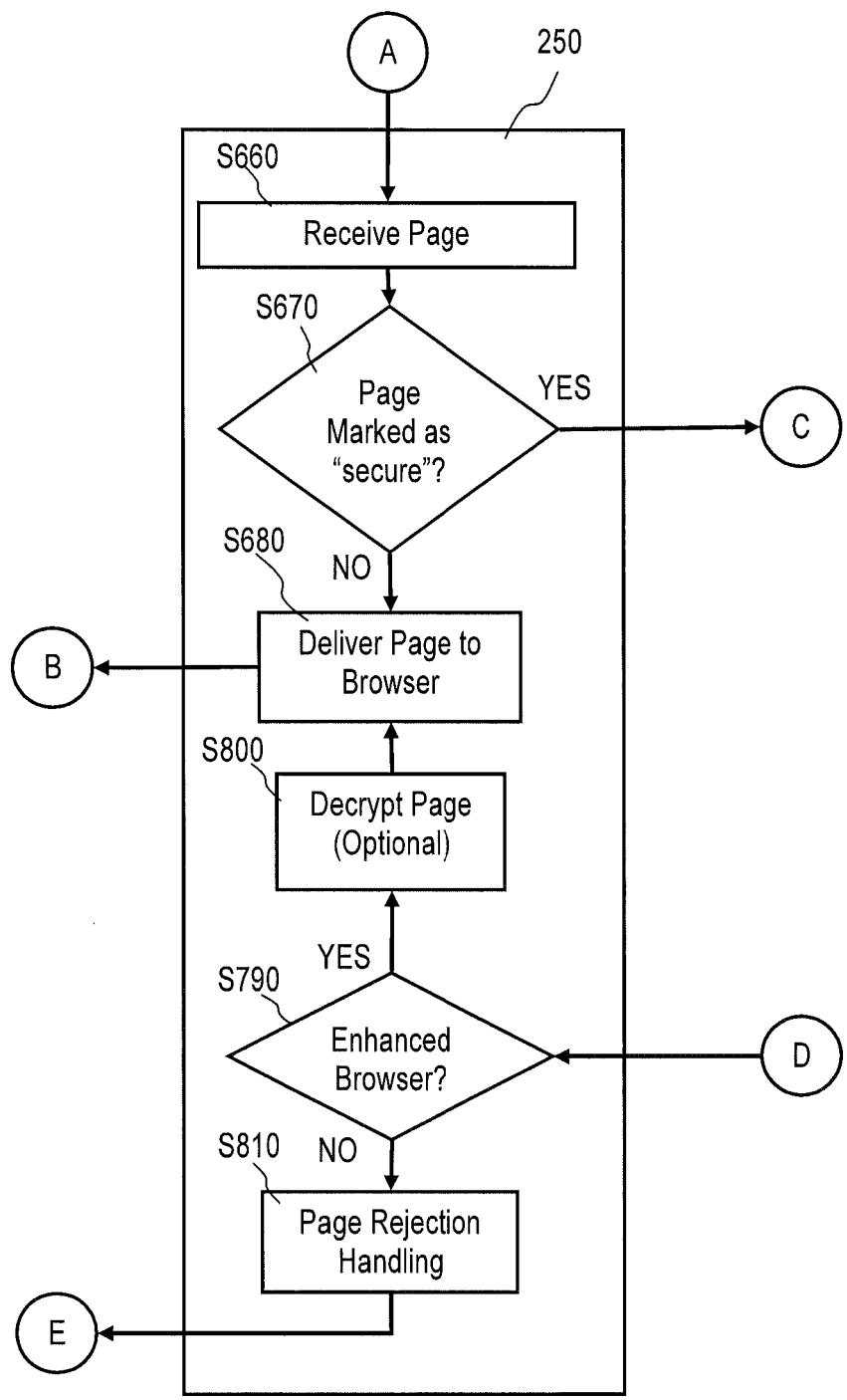
Figure 15:
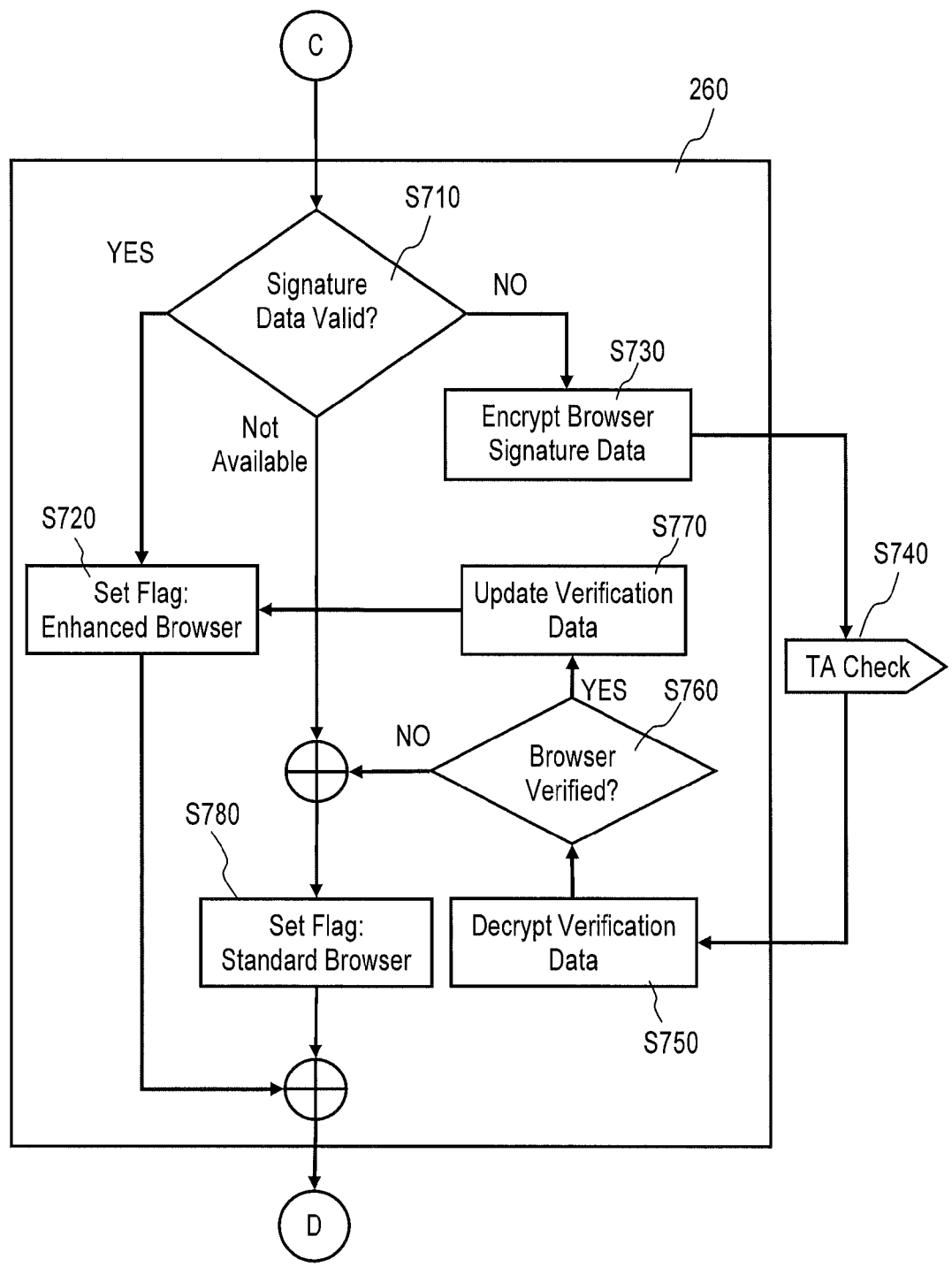

FIGS. 13 to 15 show an enhanced browser operation for a page request in the client-server infrastructure 1' of FIG. 10, in accordance with an embodiment of the present invention.

Referring to FIG. 13, the browser process for requesting a page starts by sending a page request in step S600 from the web browser 120' to the web server 172'. The web server 172' receives the page request in step S610 and determines if the requested page contains secure contents according to an aspect of the present invention in step S620. If the page does not contain secure contents the page is sent in step S650 to the client operating system 240 and is received in step S660 (FIG. 14) by the smart socket logic 250 associated to the initiating web browser 120'. If the page contains secure contents according to an aspect of the present invention, the page is optionally encrypted in step S630 (FIG. 13) and is marked as "secure" in step S640. The "secure" mark can be implemented as a new TCP/IP package type, for example. The marked page is sent to the client operating system 240 and is received in step S660 (FIG. 14) by the smart socket logic 250 associated to the initiating web browser 120'. The smart socket logic 250 determines if the received page is marked "secure" in step S670. If the page is not marked "secure", the page is delivered in step S680 to the enhanced web browser 120'. If the page is marked "secure", the smart socket logic 250 calls the signature registry 260 (FIG. 15) to verify that the web browser is an enhanced web browser 120' according to an aspect of the present invention by performing step S710 to S780, shown in FIG. 15. Once the signature registry 260 is called, a check for valid signature data is performed in step S710. If the check in step S710 yields "not available", a "standard browser" flag is set in step S780. If the check in step S710 yields "yes", an "enhanced browser" flag is set in step S720. If the check in step S710 yields "no", the signature registry 260 encrypts the signature data of the browser in step S730 and sends the signature data to the trusted authority 200. In step S740, the trusted authority 200 performs the check according to steps S530 to S550, shown in FIG. 12, and returns the resulting verification data to the signature registry 260. The signature registry 260 decrypts the verification data in step S750. If the browser is not identified as a registered enhanced browser 120' according to an aspect of the present invention in step S760, the "standard browser" flag is set in step S780. If the check in step S760 yields "yes", the browser verification data is updated in step S770 and the "enhanced browser" flag is set in step S720. The signature registry 260 returns the result of the signature check, either "standard" or "enhanced" browser, to the smart socket logic 250 associated to the initiating web browser 120'. The result is checked at the smart socket logic 250 in step S790 (FIG. 14). If the web browser is an enhanced web browser 120' according to an aspect of the present invention, the smart socket logic 250 decrypts the web page in step S800 in case it was encrypted. The web page is delivered to the enhanced web browser 120' in step S680. When the enhanced web browser 120' receives the web page in step S690 (FIG. 13), the page is rendered in step S300 either according to an aspect of the present invention or, in case of a standard web browser, according to a standard rendering method. Then the process is finished. If the web browser is a standard or otherwise unsupported web browser, the web page is rejected in step S810 (FIG. 14) and the process is finished. The page rejection of step S810 can be implemented as simple dropping the page, or by replacing the page with an information page which, for example, gives the possibilities like upgrading the browser to one according to an aspect of the present invention.

As described herein, in one embodiment, a method for ensuring integrity of a displayed web page in a client-server infrastructure is provided. The method includes, for instance, defining an enhancement for a web page markup for an enhanced web page content including a provided web page content and at least one identified provider added content as prerequisite content for the provided web page content; and implementing a secure web browser document object model (DOM) enhancement and an enhanced document object model processing embedding a user-requested content and the at least one corresponding prerequisite content based on the web page markup enhancement, wherein the requested content and the at least one prerequisite content of the enhanced web page content of an enhanced web page are secured and displayed as an entity.

In further embodiment, at least one of the following attributes are used as enhancement of the web page markup: A content identification, a calculated hash, a source location of the content or a set of binding rules defining a prerequisite logic of web page content.

In further embodiment, a received web page markup is extracted and the enhanced document object model (DOM) processing is performed if a web page markup enhancement is detected, else standard document object model (DOM) processing is performed before web page rendering.

In further embodiment, the enhanced document object model (DOM) processing verifies the prerequisite content by matching the calculated hash with hash retrieved from the prerequisite content source location utilizing an ad-hoc built prerequisite content list.

In further embodiment, the source location verifies the prerequisite content by comparing the prerequisite content with the prerequisite content in the document object model (DOM) enhancement.

In further embodiment, the prerequisite content is a software program.

In further embodiment, the web page content is provided by a first provider and the prerequisite content is provided by a second provider.

In further embodiment, the enhanced document object model (DOM) processing produces an enhanced web page comprising enhanced content only or an enhanced web page comprising enhanced content mixed with standard content.

In another embodiment, a client-server infrastructure comprises at least one web content provider with a corresponding web server, and a client with a corresponding web browser; wherein a web content creator creates an enhanced web page content by applying a markup enhancement for the enhanced web page content, which comprises a provided web page content and at least one identified provider added content as prerequisite content for the at least one provided content, wherein the web browser comprises a document object model (DOM) enhancement and runs an enhanced document object model (DOM) process embedding a user-requested content and the corresponding prerequisite content based on the markup enhancement so that the requested content and the prerequisite content of the enhanced web page content of an enhanced web page are secured and displayed as entity on a display of the client.

In further embodiment, the web browser utilizing the enhanced document object model (DOM) process extracts binding rules from the web page markup enhancement and stores them in the document object model (DOM) enhancement.

In further embodiment, the web browser renders the web page content according to a render action derived from an adherence to the binding rules.

In further embodiment, the client comprises a smart socket logic recognizing and decrypting protected parts of enhanced web page content in communication with an authentication server of a trusted authority.

In another embodiment, a data processing program for execution in a data processing system comprising software code portions for performing a method for ensuring integrity of a displayed web page in a client-server infrastructure when the program is run on the data processing system is provided.

In further embodiment, the data processing program is implemented as an integral part of a next web browser code release or as a plug-in to be added to an existing web browser code release.

In yet another embodiment, a computer program product stored on a computer-usable medium comprising computer-readable program means for causing a computer to perform a method for ensuring integrity of a displayed web page in a client-server infrastructure when the program is run on the computer is provided.

All in all, one or more aspects teach to introduce a small enhancement in the web content mark-up, in addition to the web browser code enhancement, so that the circumvention is not possible, and the interest of the web content provider and its customers is satisfied. Advantageously the small enhancement does not involve changing the whole prior art web content, but just the web content provider's specific mark-up portion for embedding additional content, provided by a third party, for example.

Embodiments of the present invention ensure that the web page will be displayed as a whole, by introducing a web browser client enhancement with a secure document object model (DOM) enhancement. The secure document object model (DOM) enhancement can either replace or extend an existing prior art document object model (DOM). The provider-added content is turned into a pre-requisite content for displaying the user-requested content. Hence, the web page consists of requested content and pre-requisite content. A method to enforce that the requested content is only displayed if the pre-requisite content is displayed, uses the following attributes, as examples: A content identification (CID), a calculated hash (C-Hash), a source location of the content and a set of binding rules. The attributes can be implemented as an enhancement of a prior art web page markup, e.g. as extension to tags like DIV and OBJECT. The extended tags identify pre-requisite parts in the web page. In addition, the extended tags ensure that the pre-requisite parts cannot be manipulated in any way by the prior art browser-executed scripts (JavaScript, Flash) or plug-ins. The binding rules define the pre-requisite logic of the web page contents. The web browser extracts the rules from the web page mark-up and stores them in the enhanced document object model (DOM). The web browser renders the web page according the render action derived from the adherence to the binding rules.

In an embodiment, a web browser document object model (DOM) processing enhancement is implemented on client-side.

In another embodiment, a minimum configuration (no binding rules) is implemented, which comprises enhanced markup, enhanced document object model (DOM) processing, and secure document object model (DOM) enhancement. For instance, instead of binding rules, hard-coding may be used that all ads are logically AND gated pre-requisites.

In another embodiment, the full configuration includes binding rules defining and/or configuring pre-requisite logic of web page contents.

In another embodiment, one or more aspects secure the document object model (DOM) for the web content provider's offering either with or without binding rules. Also the document object model (DOM) for added third-party contents, e.g. advertisement, is secured either with or without binding rules.

In another embodiment, the pre-requisite content is a software program. In this case, instead of or in addition to the content hash, a required processing state can be verified.

In another embodiment, the pre-requisite content is verified by matching a calculated hash (C-Hash) with a hash retrieved from the pre-requisite content source location utilizing an ad-hoc built pre-requisite content list. This embodiment ensures high processing performance by low data traffic between web browser and web server.

In another embodiment, the pre-requisite content is verified by comparing the pre-requisite content at source location with the pre-requisite content in the enhanced document object model (DOM). For the cost of low processing performance and high data traffic, this implementation is cheap and simple.

In another embodiment, the enhanced document object model (DOM) processing produces enhanced web page content only, such that no prior art contents can be included, as preferred in highly confidential and highly secured environments, e.g. corporate installations or enterprises.

In another embodiment, the enhanced document object model (DOM) processing produces enhanced web page content mixed with prior art contents, as required in the consumer field.

In another embodiment, a smart socket is introduced which is able to recognize an enhanced web page content according to one or more aspects of the present invention, and verifies the requesting and delivered-to browser implements all required parts of one or more aspects of the present invention.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for ensuring integrity of a displayed web page in a client-server infrastructure comprising:

creating and defining enhanced web page markup for an enhanced web page content hosted by a web content provider, the enhanced web page content comprising provided web page content received at the web content provider, at least one identified provider added content added as prerequisite content for displaying said provided web page content, and the enhanced web page markup, the enhanced web page markup comprising applied markup enhancements directing web browsers handling the prerequisite content to ensure that the prerequisite content and the provided web page content are secured and displayed as an entity by at least enforcing the prerequisite content and the provided web page content to both be included in a render tree of a web browser;

based on the web browser receiving a user requested web page based on a user request for the provided web page content, implementing and performing enhanced document object model (DOM) processing based on identifying that the received user requested web page includes the enhanced web page content, wherein the implementing comprises verifying that the web browser is an enhanced web browser that can be configured to be directed by the applied markup enhancements of the enhanced web page markup, and wherein the performing the enhanced document object model (DOM) processing comprises constructing a secure web browser document object model (DOM) based on the defined enhanced web page markup and applied markup enhancements such that the prerequisite content and the provided web page content requested by the user are enforced to both be included in the render tree of the web browser; and securing and displaying the provided web page content requested by the user with the prerequisite content as the entity by rendering from the render tree of the web browser.

2. The method according to claim 1, wherein the applied markup enhancements comprise at least one of the following attributes: a content identification (CID), a calculated hash (C-Hash), a source location of said prerequisite content or a set of binding rules defining a prerequisite logic of web page content.

3. The method according to claim 2, wherein said enhanced document object model (DOM) processing verifies said prerequisite content by matching said calculated hash (C-Hash) with hash retrieved from a source location of said prerequisite content utilizing an ad-hoc built prerequisite content list.

4. The method according to claim 2, wherein said source location verifies said prerequisite content by comparing a hash value, maintained by the source location, of said prerequisite content with the calculated hash value of the applied markup enhancements, the calculated hash being a hash value of said prerequisite content.

5. The method according to claim 1, wherein said prerequisite content is a software program.

6. The method according to claim 1, wherein said provided web page content is provided by a first provider and said prerequisite content is provided by a second provider.

7. The method according to claim 1, wherein said enhanced document object model (DOM) processing produces an enhanced web page, the enhanced web page comprising enhanced content only, or enhanced content mixed with standard content.

8. The method of claim 1, wherein the applied markup enhancements of the enhanced web page markup comprise binding rules defining at least one relationship between the provided web page content and prerequisite content, the at least one relationship including a condition, related to the prerequisite content, to be satisfied for displaying the provided web page content, wherein the web browser renders the enhanced web page according to a render action derived from an adherence to the binding rules of the applied markup enhancements.

9. A client-server infrastructure for performing a method for ensuring integrity of a displayed web page, the client-server infrastructure comprising:
at least one web content provider with corresponding web server hardware comprising a processor and memory; and
a client with a corresponding enhanced web browser;
wherein a web content creator creates and defines enhanced web page markup for an enhanced web page content hosted by a web content provider, the enhanced web page content comprising provided web page content received at the web content provider, at least one identified provider added content added as prerequisite content for displaying said provided web page content, and the enhanced web page markup, the enhanced web page markup comprising applied markup enhancements directing web browsers handling the prerequisite content to ensure that the prerequisite content and the provided web page content are secured and displayed as an entity by at least enforcing the prerequisite content and the provided web page content to both be included in a render tree of a web browser; and
wherein the enhanced web browser performs, based on the enhanced web browser receiving a user requested web page based on a user request for the provided web page content:
implementing and performing enhanced document object model (DOM) processing based on identifying that the received user requested web page includes the enhanced web page content, wherein the implementing comprises verifying that the enhanced web browser is an enhanced web browser that can be configured to be directed by the applied markup enhancements of the enhanced web page markup, and wherein the performing the enhanced document object model (DOM) processing comprises constructing a secure web browser document object model (DOM) based on the defined enhanced web page markup and applied markup enhancements such that the prerequisite content and the provided web page content requested by the user are enforced to both be included in the render tree of the enhanced web browser; and
securing and displaying the provided web page content requested by the user with the prerequisite content as the entity by rendering from the render tree of the enhanced web browser.

10. The client-server infrastructure according to claim 9, wherein the applied markup enhancements of the enhanced web page markup comprise binding rules, wherein said enhanced web browser implementing said enhanced document object model (DOM) processing extracts the binding rules from said enhanced web page markup and stores them in a secure document object model (DOM) enhancement.

11. The client-server infrastructure according to claim 10, wherein said enhanced web browser renders an enhanced web page according to a render action derived from an adherence to said binding rules of the applied markup enhancements.

12. The client-server infrastructure according to claim 9, wherein said client comprises a smart socket logic recognizing and decrypting protected parts of the enhanced web page content in communication with an authentication server of a trusted authority.

13. A computer program product for ensuring integrity of a displayed web page in a client-server infrastructure, the computer program product comprising:
a non-transitory computer readable storage medium readable by a processing circuit and storing instructions for execution by the processing circuit for performing a method comprising:
creating and defining enhanced web page markup for an enhanced web page content hosted by a web content provider, the enhanced web page content comprising provided web page content received at the web content provider, at least one identified provider added content added as prerequisite content for displaying said provided web page content, and the enhanced web page markup, the enhanced web page markup comprising applied markup enhancements directing web browsers handling the prerequisite content to ensure that the prerequisite content and the provided web page content are secured and displayed as an entity by at least enforcing the prerequisite content and the provided web page content to both be included in a render tree of a web browser;
based on the web browser receiving a user requested web page based on a user request for the provided web page content, implementing and performing enhanced document object model (DOM) processing based on identifying that the received user requested web page includes the enhanced web page content, wherein the implementing comprises verifying that the web browser is an enhanced web browser that can be configured to be directed by the applied markup enhancements of the enhanced web page markup, and wherein the performing the enhanced document object model (DOM) processing comprises constructing a secure web browser document object model (DOM) based on the defined enhanced web page markup and applied markup enhancements such that the prerequisite content and the provided web page content requested by the user are enforced to both be included in the render tree of the web browser; and securing and displaying the provided web page content requested by the user with the prerequisite content as the entity by rendering from the render tree of the enhanced web browser.

14. The computer program product according to claim 13, wherein the applied markup enhancements comprise at least one of the following attributes: a content identification (CID), a calculated hash (C-Hash), a source location of said prerequisite content or a set of binding rules defining a prerequisite logic of web page content.

15. The computer program product according to claim 14, wherein said enhanced document object model (DOM) processing verifies said prerequisite content by matching said calculated hash (C-Hash) with hash retrieved from said prerequisite content source location utilizing an ad-hoc built prerequisite content list.

16. The computer program product according to claim 14, wherein said source location verifies said prerequisite content by comparing a hash value, maintained by the source location, of said prerequisite content with the calculated hash value of the applied markup enhancements, the calculated hash being a hash value of said prerequisite content.

17. The computer program product according to claim 13, wherein said prerequisite content is a software program.

18. The computer program product according to claim 13, wherein said provided web page content is provided by a first provider and said prerequisite content is provided by a second provider.

19. The computer program product according to claim 13, wherein said enhanced document object model (DOM) processing produces an enhanced web page, the enhanced web page comprising enhanced content only, or enhanced content mixed with standard content.

20. The computer program product of claim 13, wherein the applied markup enhancements of the enhanced web page markup comprise binding rules defining at least one relationship between the provided web page content and prerequisite content, the at least one relationship including a condition, related to the prerequisite content, to be satisfied for displaying the provided web page content, wherein the web browser renders the enhanced web page according to a render action derived from an adherence to the binding rules of the applied markup enhancements.

* * * * *